(12) United States Patent
Below

(10) Patent No.: US 7,217,103 B2
(45) Date of Patent: May 15, 2007

(54) GASEOUS FLUID COMPRESSOR CONTROL SYSTEM

(75) Inventor: John Below, Oakland, CA (US)

(73) Assignee: RIX Industries, Benicia, CA (US)

( * ) Notice: Subject to any disclaimer, the term of this patent is extended or adjusted under 35 U.S.C. 154(b) by 284 days.

(21) Appl. No.: 10/880,054

(22) Filed: Jun. 29, 2004

(65) Prior Publication Data
US 2005/0287010 A1    Dec. 29, 2005

(51) Int. Cl.
*F04B 49/06* (2006.01)

(52) U.S. Cl. ............ 417/42; 417/44.11; 318/474

(58) Field of Classification Search .......... 318/474; 417/42, 44.1, 44.11
See application file for complete search history.

(56) References Cited

U.S. PATENT DOCUMENTS

| 5,736,823 | A | * | 4/1998 | Nordby et al. ............ 417/42 |
| 6,053,703 | A | * | 4/2000 | Kawaguchi et al. ....... 417/44.1 |
| 6,462,494 | B1 | * | 10/2002 | Schone et al. ........... 417/44.11 |
| 2004/0101412 | A1 | * | 5/2004 | Kallman et al. ........... 417/44.1 |

FOREIGN PATENT DOCUMENTS

JP          1-294993      * 11/1989

* cited by examiner

*Primary Examiner*—Michael Koczo, Jr.
(74) *Attorney, Agent, or Firm*—Thomas R. Lampe

(57) ABSTRACT

A system for optimizing compressor output flow when a maximum power consumption limit exists and the compressor inlet pressure can vary. Utilizing the invention the maximum compressor output flow can be obtained even while the inlet pressure to the compressor varies.

6 Claims, 1 Drawing Sheet

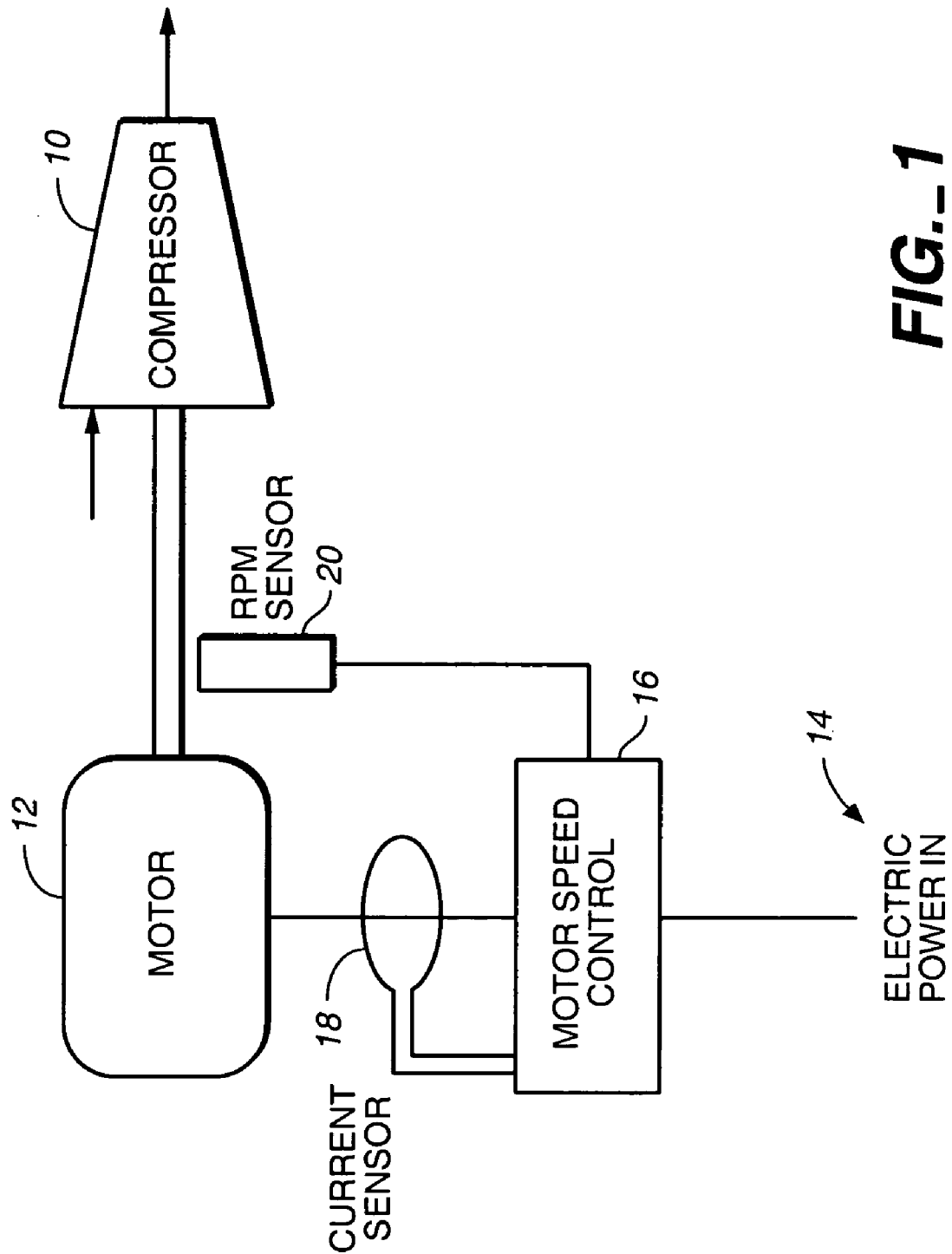
FIG._1

GASEOUS FLUID COMPRESSOR CONTROL SYSTEM

TECHNICAL FIELD

This invention relates to a method and apparatus for optimizing compressor output flow when a maximum power consumption limit exists and the compressor inlet pressure can vary. This invention is applicable, for example, to control speed of gaseous fluid compressors in aircraft.

BACKGROUND OF THE INVENTION

Situations exist wherein gaseous fluid compressors are subjected to variations in gaseous fluid inlet pressure. A drop in inlet pressure will normally result in a drop in output flow performance. For example, an airborne compressor will normally experience a drop in flow performance as the aircraft gains altitude.

DISCLOSURE OF INVENTION

The present invention ensures that the maximum compressor outlet flow can be obtained even while the inlet pressure to the compressor varies. According to the teachings of the present invention, the power to the electrical motor driving the gaseous fluid compressor is monitored and the speed of the electrical motor and the compressor speed are increased to maintain the power at its maximum limit.

The apparatus of the invention includes a gaseous fluid compressor having a fluid inlet and a fluid outlet. An electrical motor drives the gaseous fluid compressor.

A motor speed controller connects the electrical motor to a source of electric power.

A monitor operatively associated with the electrical motor and with the motor speed controller monitors electric power being delivered to the electrical motor. The motor speed controller is operable to increase the speed of the electrical motor and the gaseous fluid compressor responsive to the monitored electric power delivered to the electric motor falling below a predetermined value.

The method of the invention is for optimizing gaseous fluid compressor output flow when a predetermined maximum power consumption limit exists and gaseous fluid inlet pressure to the gaseous fluid pressure can vary.

The method includes the step of driving a fluid compressor having a fluid inlet and a fluid outlet with an electrical motor.

A motor speed controller is interposed between the electrical motor and a source of electric power.

The electric power being delivered to the electrical motor through the motor speed controller is monitored. The motor speed controller is utilized to increase the speed of the electrical motor and the gaseous fluid compressor responsive to the monitored electric power delivered to the electrical motor falling below a predetermined value. Conversely an increase in inlet pressure will cause the motor speed to decrease and prevent the motor from exceeding its power limit.

Other features, advantages and objects of the present invention will become apparent with reference to the following description and accompanying drawings.

BRIEF DESCRIPTION OF DRAWINGS

FIG. 1 is a schematic diagram illustrating components of apparatus constructed in accordance with the teachings of the present invention and for practicing the method thereof.

BEST MODE FOR CARRYING OUT THE INVENTION

Referring now to FIG. 1, a gaseous fluid compressor 10 is illustrated. The compressor has a fluid inlet and a fluid outlet as represented by the arrows associated with the compressor. The compressor is of conventional construction and is driven by a conventional electrical motor 12.

The motor and compressor may, for example, be on board an aircraft, resulting in changes in air inlet pressure to the compressor. A decrease in inlet pressure will normally cause a drop in flow performance as the aircraft gains altitude. In conventional arrangements, the compressor motor operates at a uniform normal speed. In such situations there is a fall off in electric power consumption, the power dropping below the predetermined maximum power available from an electric power inlet source 14. An increase in inlet pressure will cause the motor speed to decrease and prevent the motor from exceeding its power limit.

The purpose of the present invention is to ensure that the maximum compressor outlet flow can be obtained even while the inlet pressure to the compressor varies and drops. An airborne compressor, for example, will normally experience a drop in flow performance as the aircraft gains altitude. As stated above, the system of the present invention monitors the power to the air compressor motor and increases the compressor speed to maintain the power at its maximum limit.

According to the teachings of the present invention, a motor speed controller 16 is interposed between the electrical motor 12 and the source of electric power 14.

A monitor is operatively associated with the electrical motor 12 and with the motor speed controller 16, the monitor monitoring electric power being delivered to the electrical motor. In the arrangement illustrated, monitoring is carried out by an electric current sensor 18 which is part of a power monitoring circuit within the motor speed control. Such circuits per se are well known to persons skilled in the electrical arts and in the interest of simplicity a power specific monitoring circuit has not been shown.

The power monitoring circuit of the motor speed controller utilizes the measured current and voltage to regulate the RPMs of the motor 12 and compressor 10 to prevent the power applied to the motor from falling below a predetermined value, which may be the predetermined maximum electric power value available to the apparatus. The current sensor and motor speed controller essentially function as a feedback loop monitoring power consumption and regulating motor and compressor speed.

The system disclosed also incorporates an RPM limit control circuit of conventional construction in the motor speed controller to utilize feedback from an RPM sensor 20 measuring the rotational speed of the motor shaft to prevent the speed of the electrical motor and the gaseous fluid compressor from exceeding a predetermined speed limit. Such circuits are well known and a specific circuit is not disclosed herein. Alternatively, the motor speed control could incorporate a frequency limited control circuit of a well known character in the motor speed controller to accomplish the same end.

The invention claimed is:

1. In combination:
a gaseous fluid compressor having a fluid inlet and a fluid outlet;
an electrical motor driving said gaseous fluid compressor;
a motor speed controller connecting said electrical motor to a source of electric power;

a monitor operatively associated with said electrical motor and with said motor speed controller, said monitor monitoring electric power being delivered to said electrical motor, and said motor speed controller operable to increase the speed of said electrical motor and said gaseous fluid compressor responsive to the monitored electric power delivered to said electrical motor falling below a predetermined value; and a compressor speed sensor, said compressor speed sensor operatively associated with said motor speed controller to prevent the speed of said electrical motor and said gaseous fluid compressor from exceeding a predetermined speed limit.

2. In combination:

a gaseous fluid compressor subject to a range of inlet gaseous fluid pressures;

an electrical motor driving said gaseous fluid compressor;

a feedback loop monitoring electric power consumption by said electrical motor and regulating speed of said electrical motor and said gaseous fluid compressor responsive to changes in said monitored power consumption, said feed back loop including a sensor sensing the amount of electric current delivered to said electrical motor; and a compressor speed sensor to prevent the electrical motor from driving the gaseous fluid compressor at a speed exceeding a predetermined speed limit.

3. A method for optimizing gaseous fluid compressor output flow when a determined maximum power consumption limit exists and gaseous fluid inlet pressure to the gaseous fluid compressor can vary, said method comprising the steps of:

driving a gaseous fluid compressor having a fluid inlet and a fluid outlet with an electrical motor;

interposing a motor speed controller between said electrical motor and a source of electric power;

monitoring electric power being delivered to said electrical motor from said motor speed controller; and utilizing said motor speed controller to increase the speed of said electrical motor and said gaseous fluid compressor responsive to the monitored electric power delivered to said electrical motor falling below a predetermined value, said predetermined value being a predetermined maximum power consumption limit.

4. A method for optimizing gaseous fluid compressor output flow when a determined maximum power consumption limit exists and gaseous fluid inlet pressure to the gaseous fluid compressor can vary, said method comprising the steps of:

driving a gaseous fluid compressor having a fluid inlet and a fluid outlet with an electrical motor;

interposing a motor speed controller between said electrical motor and a source of electric power;

monitoring electric power being delivered to said electrical motor from said motor speed controller; and utilizing said motor speed controller to increase the speed of said electrical motor and said gaseous fluid compressor responsive to the monitored electric power delivered to said electrical motor falling below a predetermined value, said gaseous fluid compressor being an airborne compressor, said gaseous fluid comprising air, and said variation in inlet pressure being caused by change in the altitude of an aircraft transporting the airborne compressor.

5. A method for optimizing gaseous fluid compressor output flow when a determined maximum power consumption limit exists and gaseous fluid inlet pressure to the gaseous fluid compressor can vary, said method comprising the steps of:

driving a gaseous fluid compressor having a fluid inlet and a fluid outlet with an electrical motor;

interposing a motor speed controller between said electrical motor and a source of electric power;

monitoring electric power being delivered to said electrical motor from said motor speed controller;

utilizing said motor speed controller to increase the speed of said electrical motor and said gaseous fluid compressor responsive to the monitored electric power delivered to said electrical motor falling below a predetermined value; and employing a compressor speed sensor in operative association with said motor speed controller to prevent the speed of said electrical motor and said gaseous fluid compressor from exceeding a predetermined speed limit.

6. A method for optimizing gaseous fluid compressor output flow when a determined maximum power consumption limit exists and gaseous fluid inlet pressure to the gaseous fluid compressor can vary, said method comprising the steps of:

driving a gaseous fluid compressor having a fluid inlet and a fluid outlet with an electrical motor;

interposing a motor speed controller between said electrical motor and a source of electric power;

monitoring electric power being delivered to said electrical motor from said motor speed controller;

utilizing said motor speed controller to increase the speed of said electrical motor and said gaseous fluid compressor responsive to the monitored electric power delivered to said electrical motor falling below a predetermined value, said step of monitoring electric power being delivered to said electrical motor comprising sensing electric current flow.

* * * * *